May 7, 1940.  R. G. FLEMING  2,199,488
COMBINE HARVESTER
Filed July 27, 1936  2 Sheets-Sheet 1
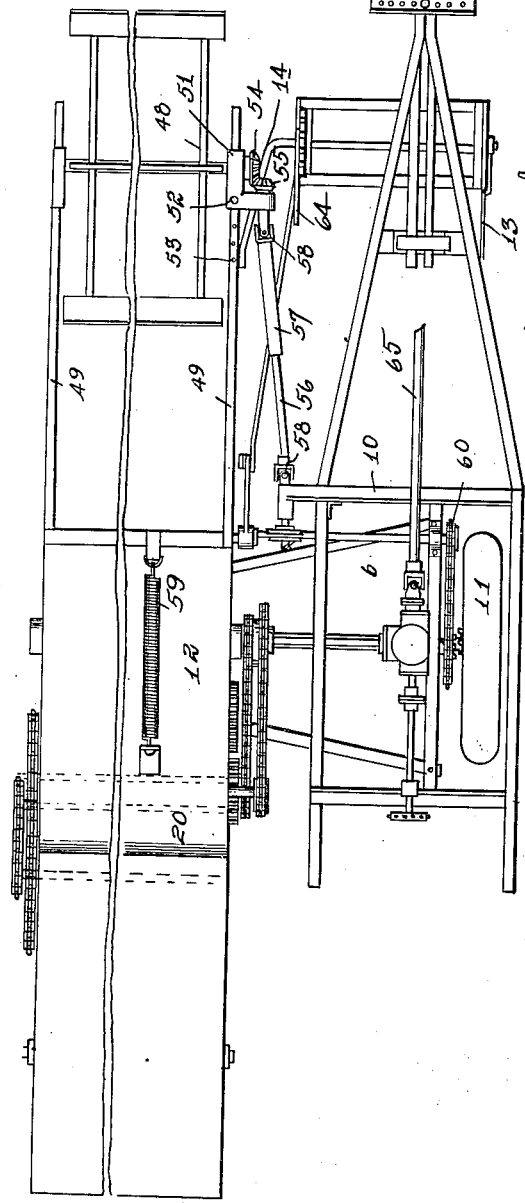
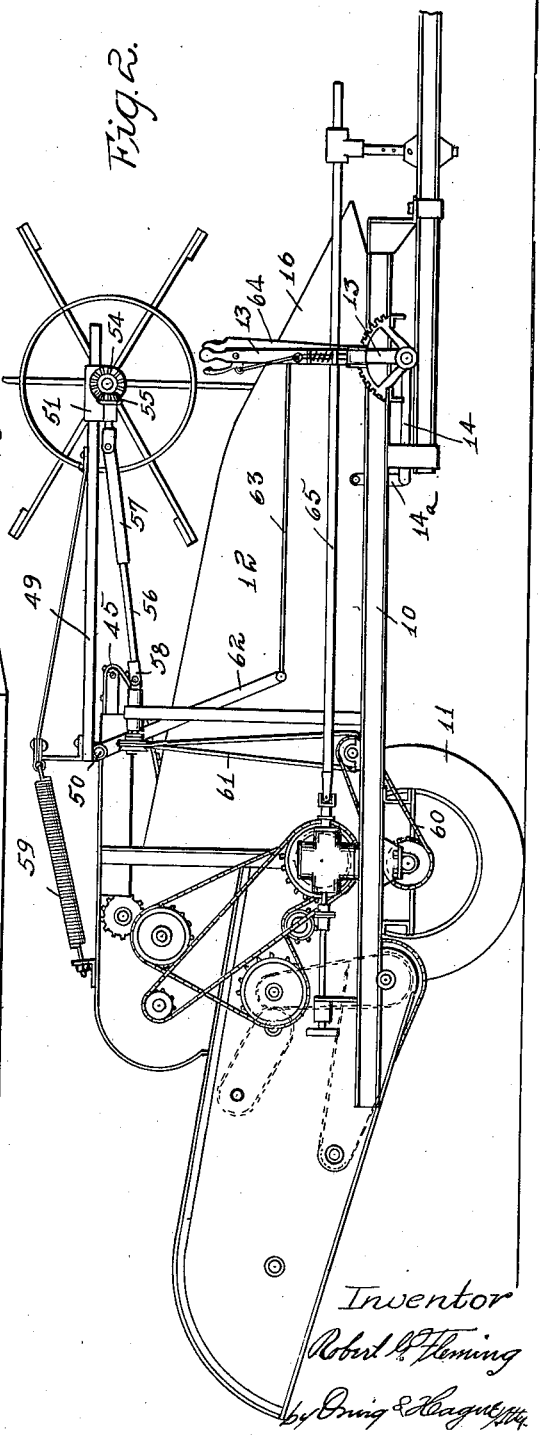
Inventor
Robert G. Fleming May 7, 1940.    R. G. FLEMING    2,199,488
COMBINE HARVESTER
Filed July 27, 1936    2 Sheets-Sheet 2
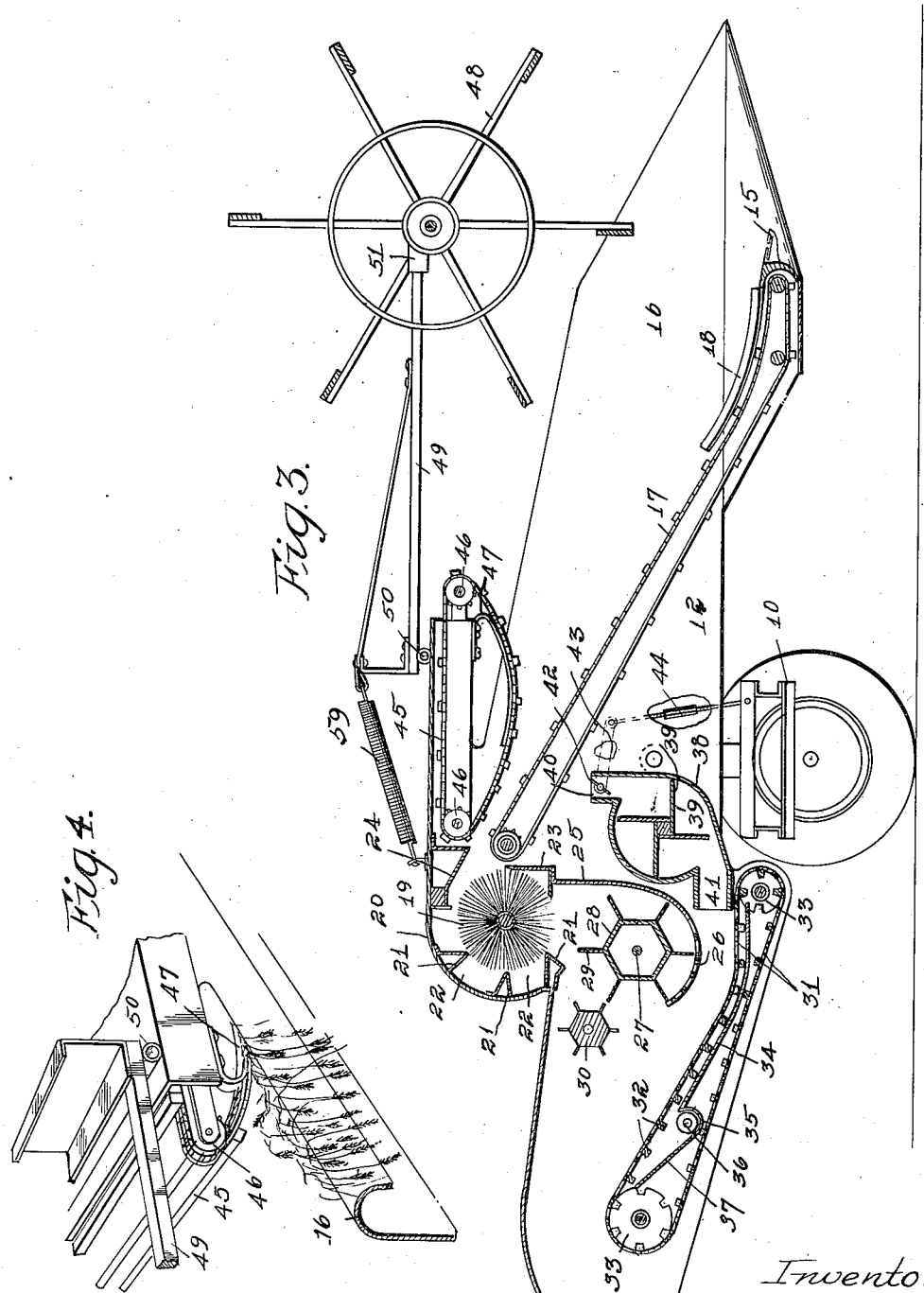

Patented May 7, 1940

2,199,488

UNITED STATES PATENT OFFICE 2,199,488

COMBINE HARVESTER

Robert G. Fleming, Chico, Calif.

Application July 27, 1936, Serial No. 92,759

1 Claim. (Cl. 130—27)

My invention relates to that class of combine harvesters known to the trade as "baby combines" and being characterized by cutting swaths of comparatively narrow width and characterized by being cheap and inexpensive in construction and capable of operation by the use of any ordinary farm tractor provided with a power take-off.

The objects of my invention are to provide a machine of this character which may be operated efficiently at comparatively high speed to thereby cut and thresh a comparatively high acreage in a given time.

A further object is to provide a machine of this class which will operate at maximum efficiency on hillsides where one side of the harvester is elevated a substantial distance above the other side, and also which will operate at maximum efficiency when traveling up or down hill.

A further object is to provide a machine of this class in which the material is processed from the time it is cut until the straw, stalks, trash, etc., are delivered from the machine in substantially straight lines through the machine with all operations carried on upon the full width of the swath, and whereby the various operations are carried out upon a relatively thin mass of the material, to thereby provide highly efficient separation.

In the accompanying drawings Figure 1 shows a top or plan view of a machine embodying my invention.

Figure 2 shows a side elevation of same.

Figure 3 shows a vertical longitudinal sectional view of same; and

Figure 4 shows a detail perspective view illustrating my improved means for removing materials from the swath boards and forcing them into the threshing mechanism.

Referring to the accompanying drawings I have used the reference numeral 10 to indicate generally the machine frame mounted upon two supporting wheels 11.

Pivotally mounted upon the main frame is the harvester body, indicated generally by the reference numeral 12, and this body is made capable of being tilted to any desired position by means of the lever 13 pivoted in the frame 10 and having a crank arm 14 connected by a link 14a with the harvester frame 12.

At the forward end of the main frame is a sickle bar 15 of ordinary construction, and at the ends of the sickle bar are the swath boards 16 the top surfaces of which incline upwardly and rearwardly.

Extending from the sickle bar upwardly and rearwardly between the swath boards is the conveyor 17. At the forward end of this conveyor 17 and immediately in the rear of the sickle 15 I have provided guides 18 to engage the top of the conveyor to guide a portion of the conveyor nearly horizontally rearwardly from the sickle bar before it commences to move upwardly, the object of which is, that when the sickle bar is positioned close to the ground, and the grain falls upon the conveyor, it will not tend to "dribble" downwardly in front of the sickle.

At the rear of the conveyor 17 is the threshing mechanism which consists of a rotatable brush 19 extended transversely of the machine and contained within the brush casing 20. On the interior of the casing is a series of inwardly extended baffles 21 forming between them pockets or compartments 22. This casing is open at its front to receive material to be threshed from the conveyor 17, and it has an opening at its bottom through which the material is discharged. The top of the brush moves rearwardly through this casing. During a threshing operation the brush creates a considerable amount of wind, and in some materials it creates a great amount of dust. For the purpose of preventing this wind and dust from passing out through the intake opening of the casing I have provided a deflector plate 23 located at the lower forward portion of the brush and extended straight upwardly so that the current of wind created by the brush is thrown straight upwardly at the front of the brush against the inclined deflector plate 24 which extends upwardly and rearwardly and thus returns the dust and wind back into the casing so that the wind does not interfere with the entrance of material into the threshing mechanism, and so that no dust will be discharged out through the intake opening of the casing.

Beneath the threshing mechanism is the combined retarding and screening device which comprises a sheet metal wall 25 extended downwardly from the forward side of the discharge opening from the threshing mechanism, and then curved rearwardly and upwardly and provided with relatively large perforations 26 to perform a preliminary screening operation. Mounted within this wall and screen 25 and 26 is a retarder comprising a rotary shaft 27 provided with a hollow body 28 from which there projects radially a series of flexible retarder blades 29, and these blades in their movement touch or come close to the screen portion of the wall 25.

At the rear upper portion of the rotary retarder is a rotary stripper 30 with its forward portion moving downwardly adjacent the upwardly moving radial blades at the rear of the retarder. A space is provided at the upper rear portion of the retarder so that the wind and dust from the threshing mechanism will pass out through this space without carrying with it any substantial amount of the material being operated upon.

The said threshing mechanism, retarder member and stripper are all of substantially the same length, and the swath of material being operated on goes through them along substantially straight lines from front to rear of the machine without at any point materially increasing the thickness of the material being operated on from that of the original swath as it was cut.

In practice the threshing mechanism is rotated at comparatively high speed in order to operate efficiently, and due to the fact that it creates a large amount of wind it would normally tend to throw the threshed material violently to a considerable distance. With my improved retarding device, however, the material thus threshed immediately passes into the pockets of the retarding device formed by the radial blades 29 and the wall 25. This retarding device operates at relatively slow speed so that during operation one of the pockets 28 is substantially filled with threshed material, including the straw, chaff, weeds, etc., and then this particular pocket moves downwardly across the wall 25 until it reaches the screen 26, at which point the major portion of the grain and small chaff passes through the large openings of the screen, and the straw, weeds and trash, etc., are discharged from the rear of the screen by the flexible blades. All of the wind which accompanies the material being threshed is deflected from the material in these pockets, and it passes upwardly and rearwardly over the stripper 30. By this means obviously the machine can be built of relatively short length and compact arrangement and greatly increased efficiency.

One of the major advantages of my improved retarder and screening device is, that when one side of the machine is elevated a substantial distance above the other, as when traveling on a hillside, the material within each of the pockets 28 does not tend to move substantially toward the lower side of the machine because the straw, chaff, trash, etc., within the pocket substantially fills it, to the extent at least that it prevents this side movement of the material within the pocket. Hence, the material contained in the entire width of the pocket is delivered to the large screen 26 and the material is operated on by the screen throughout its entire width.

Located beneath the screen 26 is an endless perforated conveyor screen 31 having slats 32 on its inner surface. These slats travel around the slotted discs 33 at both ends, by which means the conveyor screen is operated.

On the interior of the space between the upper and lower portions of the conveyor screen I have provided a grain pan 34 extending first rearwardly and then upwardly and rearwardly, and delivering its grain into the conveyor chute 35 in which there is contained a screw conveyor 36, and then above the conveyor chute 35 the grain pan 37 extends upwardly and rearwardly. In operation the main portion of the grain passes through this perforated conveyor 31 before it reaches the screw conveyor 36, but if any of such material should pass through the screen beyond the conveyor 36, it would be returned by gravity to the conveyor trough by the grain pan 37.

In front of the retarding and screening mechanism is a fan casing 38 in which is contained a fan 39 having at its top an inlet opening 40, and the outlet opening 41 extends rearwardly to the lower end of the fan casing and projects from one side of the machine frame to the other the full width of the swath being cut by the sickle. In the intake opening 40 I have provided a damper 42. At the end of the damper is a lever 43, and an adjustable rod 44 connects such lever with a part of the main frame 10.

In operation with this damper, when the front end of the machine and the sickle are moved downwardly close to the ground the damper is opened to deliver a relatively large blast of air from the fan, and when the front end of the machine is elevated the damper is moved toward closed position to deliver a relatively small amount of air blast to the space between the screens 26 and 31. The function of this fan 39 is as follows:

During the operation of the machine substantially all of the grain and chaff and light materials pass through the screen 26, whereas the straw, trash, etc., are carried beyond the delivery end of the screen 26. This straw and chaff will normally fall by gravity upon the top of the perforated conveyor and will tend to flow through the openings of said conveyor. However, the chaff would normally fill a large proportion of said openings and thus prevent the grain from going through. With my improvement, and by creating a wind blast of suitable pressure delivered rearwardly directly beneath the screen 26 and during the passage of the material from the screen 26 to the screen 31, substantially all of the chaff and lighter particles are blown rearwardly and outwardly over the screen 31, so that only the grain and heavier particles fall upon the perforated conveyor 31. Hence, a maximum efficiency is attained for this screen 31.

In this connection, the operation of the damper 40 is as follows: When the forward end of the machine is at its downward limit of movement the screen 31 is inclined upwardly at a relatively steep angle, and it requires a heavier blast of air to carry the chaff and straw upwardly and rearwardly over it, whereas, when the front of the machine is elevated the screen 31 is nearer to a horizontal position and, hence, a relatively less blast of air is sufficient to carry away the straw and chaff, and a heavier air blast might carry grain with it over the rear of the conveyor 31. With my improvement the amount of the air blast is proportioned automatically by the position of the cutter bar relative to the ground.

At the point where the material is being delivered into the threshing mechanism I have provided a means for stripping the material from the rear ends of the swath boards and compressing said material and forcing it into the threshing mechanism. This device comprises a slatted conveyor 45 having sprockets 46, the top portion of the conveyor being substantially horizontal and the lower portion of the conveyor being bowed downwardly. For the purpose of holding the lower portion of the conveyor in this position I have provided spring guides 47 at the opposite sides of the conveyor, curved downwardly and rearwardly in a direction causing a portion of the slatted conveyor to move downwardly and rearwardly across the upwardly and rearwardly inclined portion of the swath boards, and the ends of these slats move close to the inner surfaces of the swath boards.

In practice it frequently happens that large stalks, vines, weeds, etc., when cut off by the sickle fall over the swath boards and are carried up by the conveyor and become lodged at the upper ends of the swath boards. By means of my improvement all such material is engaged by the slatted conveyor and stripped from the swath boards and compressed in a small enough area to enter the casing of the threshing mechanism.

For supporting the reel 48 I have provided two arms 49 pivoted to the frame at 50. The reel is mounted upon brackets 51 slidingly mounted on the arms 49, one of said brackets being adjustably fixed to one of the arms 49 by means of a pin 52 which may be placed in any of the slots 53. The reel is provided with a beveled gear 54 in mesh with a beveled gear 55, which latter gear is driven through a shaft 56 having a telescopic member 57 and universal joints 58. By this means the reel may be moved forwardly and rearwardly as desired and driven by the shaft 56 to any position of its adjustment. The arms 49 are yieldingly held in their elevated position by a spring 59. The reel is driven from the axle of the driving wheels 11 through the sprocket gearing 60 and belt and pulley device 61. The reel may also be adjusted upwardly and downwardly relative to the cutter by means of the crank 62 connected by the rod 63 with the lever 64.

The various threshing and screening portions of my harvester are driven from a shaft 65 intended to be connected with a power take-off from a tractor, and power from the shaft 65 is transmitted through various gearing mechanisms at the speed at which it is desired to drive the various parts. This mechanism consists of ordinary gearing devices which it is believed unnecessary to here specifically describe.

I have embodied my invention in a full sized machine which I have successfully and efficiently operated in crops of widely diversified character, and have had excellent results with such crops as soy beans, clover and grain stalks of unusually great length and also unusually short stalks.

I have also successfully operated my machine on hillsides and uphill and downhill, and have demonstrated that my machine will successfully and efficiently thresh crops under all hillside conditions where an ordinary binder can be successfully operated. It is well known that the so-called combine harvesters heretofore used will not operate efficiently on hillsides and that where a combine harvester must be employed for hillside cutting it has been a common expedient to provide such machines with an automatic leveler for the screening mechanism, so that all of the grain or material being operated could not roll by gravity to one side of the screen and thereby excessively load that side and prevent efficient separation. However, with my improvement I have found that my improved retarding and screening mechanism retains the full width and depth of the swath during its passage through the machine so that on hillsides material from the retarder and screener will be delivered to all portions of the screening conveyor 31 throughout the entire width of the swath cut, and when once delivered to all parts of this screen 31 it will be efficiently screened, even though there should be some tendency for the grain to roll laterally over the screen 31.

One of the reasons why I am able to so efficiently effect the separation of the grain from the chaff and straw after it is discharged from the retarding and screening mechanism is, that the fan 39 produces a blast of air of just the right force for blowing the light chaff and dust out of the material passing through the screen 26 without blowing away the grains, and these lighter materials, such as chaff, are blown above the top of the screen conveyor 31 so that they will not become lodged in the perforations of said screen, and whereby all of the perforations of the screen are left open to receive the grains or seeds to be separated.

I claim as my invention:

In a threshing machine, the combination with a threshing element of an open-topped casing positioned to receive material from the threshing element and having a curved lower portion to receive and support said material, a shaft within said casing, a series of radially arranged blades fixed to the shaft and extended substantially the full width of the casing and having their outer edges close to the casing at the bottom portion thereof to thereby form pockets into which the said material is delivered by the threshing mechanism and temporarily held by gravity, means for rotating said shaft for moving said material over the bottom of the casing to a point of discharge at the rear of the casing, a screening device positioned to receive the material thus delivered from the pockets, and a rotary stripper device positioned to engage material on the outer edges of said blades when they have moved beyond the bottom of the casing for removing trash therefrom.

ROBERT G. FLEMING.